US008934859B2

(12) United States Patent
Dickman et al.

(10) Patent No.: US 8,934,859 B2
(45) Date of Patent: Jan. 13, 2015

(54) SYSTEM AND METHOD FOR DETECTION OF RF SIGNAL SPOOFING

(71) Applicants: Jeff Dickman, Thousand Oaks, CA (US); Reza Ahmadi, Westlake Village, CA (US); Mathew A. Cosgrove, Woodland Hills, CA (US); Sanjeev Gunawardena, Athens, OH (US)

(72) Inventors: Jeff Dickman, Thousand Oaks, CA (US); Reza Ahmadi, Westlake Village, CA (US); Mathew A. Cosgrove, Woodland Hills, CA (US); Sanjeev Gunawardena, Athens, OH (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 13/713,708

(22) Filed: Dec. 13, 2012

(65) Prior Publication Data

US 2013/0157605 A1 Jun. 20, 2013

Related U.S. Application Data

(60) Provisional application No. 61/570,919, filed on Dec. 15, 2011.

(51) Int. Cl.
*H04B 1/10* (2006.01)
(52) U.S. Cl.
CPC ............................. *H04B 1/10* (2013.01)
USPC ......... 455/296; 455/1; 455/67.11; 455/226.1; 455/130
(58) Field of Classification Search
CPC .................... H04B 1/00; H04B 2001/10
USPC .............. 455/1, 501, 63.1, 67.11, 130, 226.1, 455/278.1, 296
See application file for complete search history.

(56) References Cited

U.S. PATENT DOCUMENTS

| | | | |
|---|---|---|---|
| 3,795,912 A | 3/1974 | Pierce et al. | |
| 4,429,310 A | 1/1984 | Zscheile, Jr. et al. | |
| 6,639,541 B1 | 10/2003 | Quintana et al. | |
| 7,623,439 B2 | 11/2009 | Webster et al. | |
| 7,929,409 B2 | 4/2011 | Chitrapu et al. | |
| 7,952,519 B1 * | 5/2011 | Nielsen et al. | 342/378 |
| 8,044,857 B2 | 10/2011 | Maenpa et al. | |
| 2005/0180315 A1 | 8/2005 | Chitrapu et al. | |

(Continued)

FOREIGN PATENT DOCUMENTS

| | | |
|---|---|---|
| EP | 0 063 496 B1 | 10/1985 |
| EP | 0 229 313 A3 | 7/1987 |

(Continued)

OTHER PUBLICATIONS

Psiaki, et al.: "*GPS Spoofing Detection Via Dual-Receiver Correlation of Military Signals*"; Department of Aerospace Engineering & Engineering Mechanics, The University of Texas at Austin, Austin, Texas 787122-0235, pp. 1-15.

*Primary Examiner* — Tuan Pham
(74) *Attorney, Agent, or Firm* — Tarolli, Sundheim, Covell & Tummino LLP (57) ABSTRACT

One embodiment of the invention includes a radio frequency (RF) receiver system. The system includes an antenna configured to receive an RF input signal and an RF signal front-end system configured to process the RF input signal to generate an equivalent digital signal. The system also includes a spoof detection system configured to analyze a power spectral density (PSD) of the equivalent digital signal and to compare the PSD of the equivalent digital signal with a predetermined baseline PSD to detect the presence of a spoofing signal component in the RF input signal.

13 Claims, 5 Drawing Sheets

(56) References Cited

U.S. PATENT DOCUMENTS

2006/0074558 A1 4/2006 Williamson et al.
2011/0050489 A1 3/2011 Maenpa et al.
2011/0102259 A1* 5/2011 Ledvina et al. .......... 342/357.59
2013/0002477 A1* 1/2013 Dehnie et al. .............. 342/357.3

FOREIGN PATENT DOCUMENTS

| EP | 0 229 313 B1 | 11/1990 |
| WO | WO 2005/069836 A3 | 8/2005 |
| WO | WO 2005/117314 A1 | 12/2005 |

* cited by examiner

SYSTEM AND METHOD FOR DETECTION OF RF SIGNAL SPOOFING

RELATED APPLICATIONS

This application claims priority from U.S. Provisional Patent Application Ser. No. 61/570,919, filed 15 Dec. 2011, which is incorporated herein in its entirety.

TECHNICAL FIELD

The present invention relates generally to radio frequency (RF) receiver systems, and specifically to a system and method for detection of RF signal spoofing.

BACKGROUND

Certain encoded radio frequency (RF) signals, such as global positioning satellite (GPS) signals, may have weak amplitudes relative to noise and/or other interference. For example, GPS signals may be approximately 30 dB weaker than power due to thermal noise. Therefore, such signals can be vulnerable to jamming and spoofing. As an example, in some jamming scenarios, the RF signal is difficult to detect due to intentional interference. In spoofing, a signal that is similar to the RF signal (e.g., a GPS signal) is transmitted to feed false information to the signal receiver. An example of a method for spoofing GPS signals is called meaconing, where the spoofer rebroadcasts the GPS signal with a delay to confuse the GPS receiver.

SUMMARY

One embodiment of the invention includes a radio frequency (RF) receiver system. The system includes an antenna configured to receive an RF input signal and an RF signal front-end system configured to process the RF input signal to generate an equivalent digital signal. The system also includes a spoof detection system configured to analyze a power spectral density (PSD) of the equivalent digital signal and to compare the PSD of the equivalent digital signal with a predetermined baseline PSD to detect the presence of a spoofing signal component in the RF input signal.

Another embodiment of the invention includes a non-transitory computer readable medium configured to implement a method for detecting a spoofing signal component in an input radio frequency (RF) signal. The method includes generating a baseline PSD associated with a predetermined RF signal and receiving the RF input signal. The method also includes processing the RF input signal to generate an equivalent digital signal and generating a PSD of the equivalent digital signal. The method further includes comparing the PSD of the equivalent digital signal with the baseline PSD to detect the presence of the spoofing signal component in the input RF signal.

Yet another embodiment of the invention includes an RF receiver system. The system includes an antenna configured to receive an RF input signal, an RF signal front-end system configured to process the RF input signal to generate an equivalent digital signal, and a spoof detection system. The spoof detection system includes a memory configured to store a predetermined baseline PSD corresponding to a baseline RF signal in which the spoofing signal component is known to be absent. The spoof detection system also includes a PSD processor configured to generate a time-averaged PSD of the equivalent digital signal and a PSD comparator configured to implement a statistical difference algorithm across the time-averaged PSD of the equivalent digital signal relative to the predetermined baseline PSD to detect a spoofing signal component in the RF input signal.

DETAILED DESCRIPTION

The present invention relates generally to radio frequency (RF) receiver systems, and specifically to a system and method for detection of RF signal spoofing. An RF receiver system includes an antenna configured to receive an RF input signal and an RF signal front-end configured to generate an equivalent digital signal of the RF input signal. The equivalent digital signal is provided to a spoof detection system that is configured to detect a spoofing signal component in the RF input signal. As an example, the spoof detection system can be configured to generate a power spectral density (PSD) of the equivalent digital signal and to compare the PSD of the equivalent digital signal with a predetermined baseline PSD, such as generated previously based on an RF input signal that is known to be absent a spoofing signal component. Therefore, the spoof detection system can detect the presence of a spoofing signal component in the RF input signal based on the comparison.

As an example, the RF receiver system can be a global positioning satellite (GPS) receiver system. An electronic attack (EA) transmitter can distort a fundamental signature of a receiver front-end transfer function as it attempts to jam, spoof, or otherwise interfere with a targeted navigation system. The RF signal front-end system can capture a full global navigation satellite system (GNSS) signal bandwidth with high dynamic range, such that distortions can be monitored with high-fidelity. Larger distortions caused by the EA transmitter transfer function can provide stronger detection test statistics.

The spoof detection system can include a PSD processor that performs a discrete Fourier transform (DFT) operation on the received RF signal, such that the spoof detection system can be sensitive to both conventional threats (CT) and emerging threats (ET). As the DFT engine in the PSD processor sweeps through the received band of the RF input signal via the equivalent digital signal, it computes an estimate of the PSD. The spoof detection system can buffer values of the received band of the RF input signal until the sweep is completed. A normalization component performs normalization to remove amplitude sensitivities. The spectral difference indicator test statistic is computed by subtracting the stored predetermined baseline PSD from the real-time estimated PSD signature.

Figure 1:
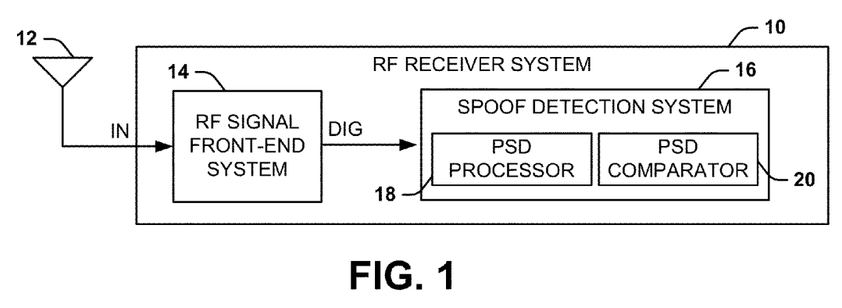
FIG. 1 illustrates an example of a radio frequency (RF) receiver system in accordance with an aspect of the invention.

FIG. 1 illustrates an example of an RF receiver system 10 in accordance with an aspect of the invention. The RF receiver system 10 can be implemented in a variety of RF signal applications. As an example, the RF receiver system 10 can be a GPS receiver system that can be implemented in a variety of navigation applications, such as aviation, nautical applications, and/or weapon guidance systems.

The RF receiver system 10 includes an antenna 12 and an RF signal front-end system 14. The antenna 12 is configured to receive an RF signal, such as a GPS signal. In the example of FIG. 1, the RF signal is demonstrated as a signal IN provided from the antenna 12. The RF signal front-end system 14 can include a variety of digital antenna electronics (DAE), such as including an analog-to-digital converter (ADC), gain control, and a variety of other signal processing components. The RF signal front-end system 14 is configured to generate a digital signal DIG that is a digital equivalent to the RF signal IN. As an example, the digital signal DIG can be a direct equivalent to the RF signal IN, or can have been processed, such as amplified and/or demodulated to an intermediate frequency (IF) by the RF signal front-end system 14.

The digital signal DIG is provided to a spoof detection system 16 that is configured detect the presence of a spoofing signal component in the RF signal IN based on the digital signal DIG. In the example of FIG. 1, the spoof detection system 16 includes a PSD processor 18 that is configured to generate a power spectral density (PSD) representation of the digital signal DIG. As an example, the PSD processor 18 can perform one or more time and/or amplitude based algorithms to generate the PSD of the digital signal DIG. For example, the PSD processor 18 can be configured to generate a time-based average of the PSD of the digital signal DIG, and/or can normalize a magnitude of the PSD of the digital signal DIG. As a result, the detection of the spoofing signal component can be accurate and substantially insensitive to amplitude variations, such as resulting from temperature variations.

The spoof detection system 16 also includes a PSD comparator 20 that is configured to compare the PSD of the digital signal DIG with a predetermined baseline PSD. As an example, the predetermined baseline PSD can correspond to a PSD of a previously received RF signal that was known to be absent a spoofing signal component. The predetermined baseline PSD can alternatively correspond to offline simulated data. The predetermined baseline PSD can be stored in memory in the spoof detection system 16, such that the predetermined baseline PSD can be periodically accessed for the comparison of the PSD of the digital signal DIG with the predetermined baseline PSD.

As an example, the comparison of the PSD of the digital signal DIG with the predetermined baseline PSD can be based on application of a statistical difference algorithm across the PSD of the digital signal DIG relative to the predetermined baseline PSD to detect the spoofing signal component in the RF signal IN. For example, the statistical difference algorithm could be a standard deviation difference across the PSD of the digital signal DIG relative to the predetermined baseline PSD. For example, if the standard deviation difference exceeds a threshold, such as through significant portions of the PSD of the digital signal, then the PSD comparator 20 could determine the presence of the spoofing signal component in the RF signal RF.

Figure 2:
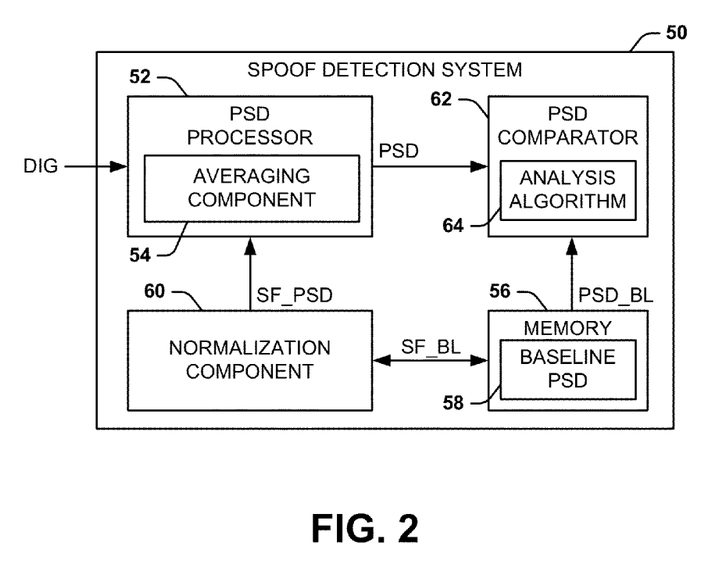
FIG. 2 illustrates an example of a spoof detection system in accordance with an aspect of the invention.

FIG. 2 illustrates an example of a spoof detection system 50 in accordance with an aspect of the invention. The spoof detection system 50 can correspond to the spoof detection system 16 in the example of FIG. 1. Therefore, reference is to be made to the example of FIG. 1 in the following description of the example of FIG. 2. Furthermore, it is to be understood that the spoof detection system 50 can be implemented in hardware, software, or a combination of hardware and software.

The spoof detection system 50 includes a PSD processor 52 that is configured to receive the digital signal DIG, such as from the RF signal front-end system 14. The PSD processor 52 is configured to generate the PSD of the digital signal DIG. For example, the PSD processor 52 can sweep through the frequency band of the digital signal DIG and perform discrete Fourier transform (DFT) operations on the samples therein to generate an estimate of the PSD of the RF signal IN. As an example, the PSD generated by the PSD processor 52 can be defined as follows:

$$PSD(k) = \tilde{D}(k) \times \tilde{D}(-k) = |D(k)|^2 \qquad \text{Equations 1}$$

$$\tilde{D} = FFT|D|$$

$$\tilde{D}(k) = \frac{1}{N}\sum_{i=1}^{N} D(i)\omega_N^{(i-1)(k-1)}$$

$$\omega_N \equiv \exp\left(-\frac{i2\pi}{N}\right)$$

Where:
N corresponds to a number of samples in a time block for forming the PSD;
D(i) corresponds to the data samples from the RF signal front-end system 14;
$\tilde{D}(k)$ corresponds to the DFT, k=−N/2 ... N/2.

Figure 3:
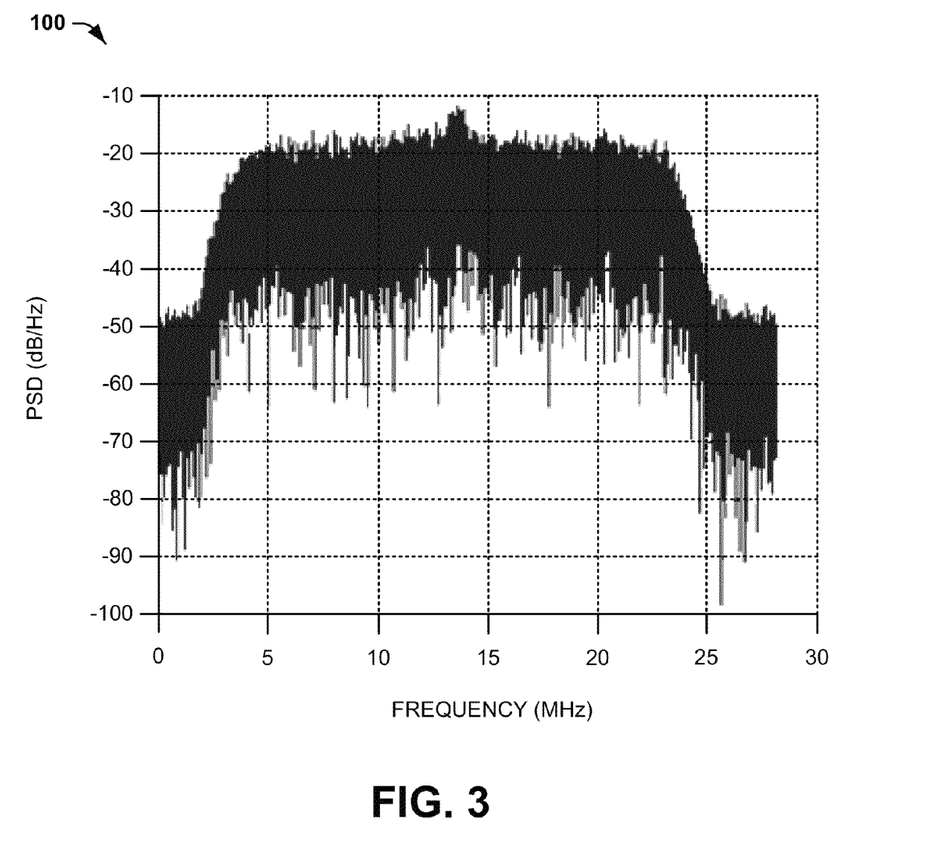
FIG. 3 illustrates an example diagram 100 of a power spectral density (PSD) of an RF signal in accordance with an aspect of the invention.

The Equations 1 thus define the function associated with the PSD generated by the PSD processor 52 in a given time block. FIG. 3 illustrates an example of a PSD 100 of the RF signal IN in accordance with an aspect of the invention. The PSD 100 can be generated by the PSD processor 52, such as defined by the Equations 1. In the example of FIG. 3, the PSD 100 is demonstrated as having a bandwidth of approximately 28 MHz. As an example, the PSD 100 can be generated over a one millisecond (ms) time block. For example, at a sample rate of 56.32 mega samples per second (MSPS), the PSD processor 52 can generate the time-averaged PSD based on 56,320 samples in the 1 ms time block. The PSD processor 52 can continuously and sequentially generate PSDs of the digital sample DIG, such as the PSD 100, as digital samples of the digital sample DIG are received.

Referring back to the example of FIG. 2, the PSD processor 52 includes an averaging component 54 that is configured to generate a time-average of the PSD of the digital signal DIG. The time-average generated by the averaging component 54 can average the PSD of the digital signal DIG over a predetermined number of time blocks, such as to optimize the spoof detection system 50 to balance accuracy versus response time in detecting a spoofing signal component in the RF signal IN. A variety of time blocks can be implemented by the averaging component 54 to generate the time-averaged PSD of the digital signal DIG. For example, the averaging component 54 can form the time-averaged PSD of the digital signal DIG over a plurality of 1 ms blocks (e.g., 56,320 samples per time block).

Figure 4:
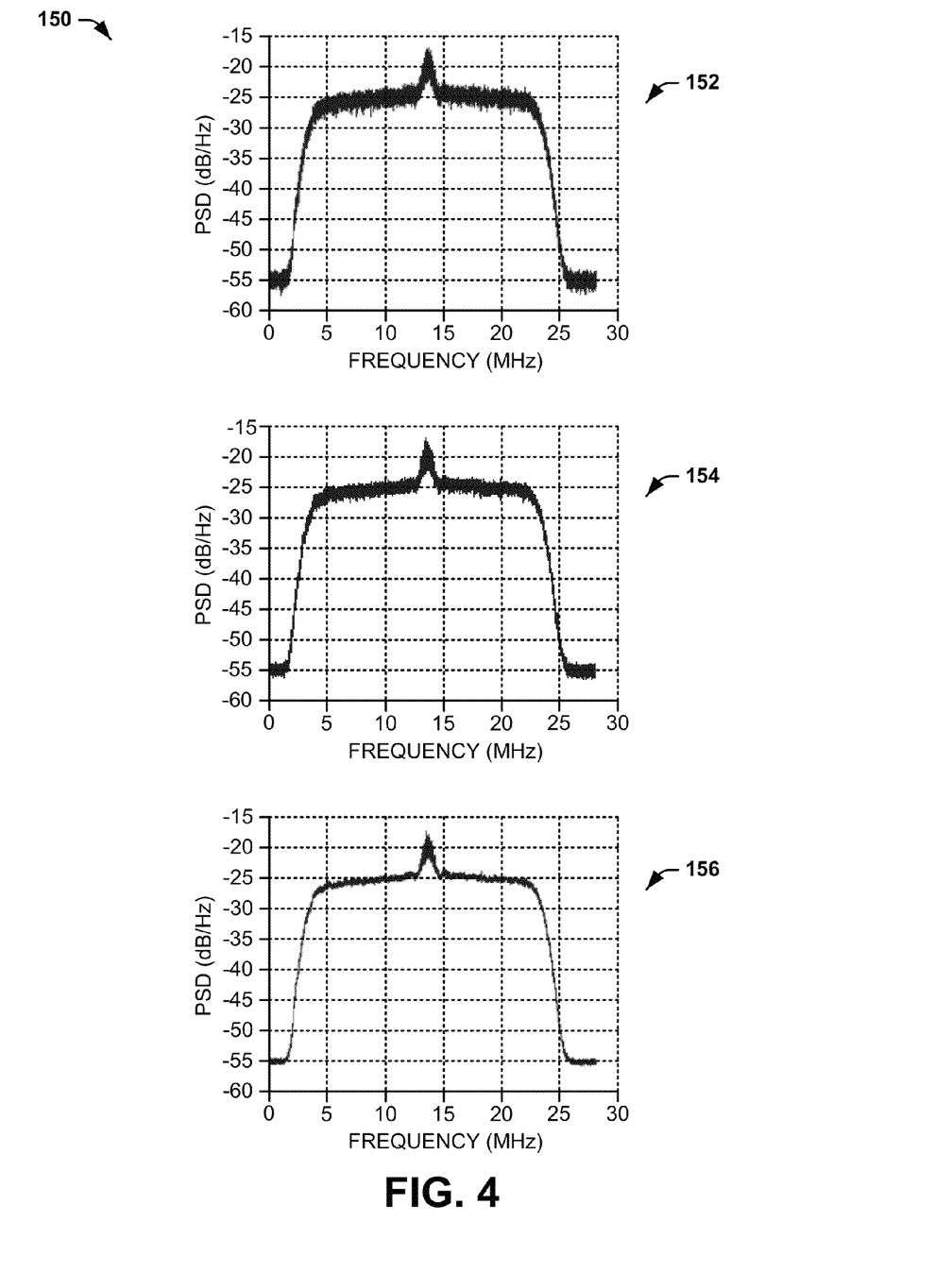
FIG. 4 illustrates an example diagram 100 of time-averaged PSDs of an RF signal in accordance with an aspect of the invention.

FIG. 4 illustrates an example diagram 150 of time-averaged PSDs of the RF signal IN in accordance with an aspect of the invention. In the example of FIG. 4, each of the time-averaged PSDs can correspond time-averaging of the PSD 100 in the example of FIG. 3. The diagram 150 includes a first PSD 152 corresponding to a time-averaged PSD across fifty time blocks, a second PSD 154 corresponding to a time-averaged PSD across one hundred time blocks, and a third PSD 156 corresponding to a time-averaged PSD across five hundred time blocks. As demonstrated by the diagram 150, the greater the number of time blocks in generating the time-averaged PSDs 102, 104, and 106, the greater the resolution of the time-averaged PSD. In the example of FIG. 3 described previously, the PSD 100 is demonstrated as very noisy, such that it spans a power range from approximately −14 dB/Hz at a peak (i.e., at a center frequency of approximately 13.6 MHz) to greater than approximately −90 dB/Hz (i.e., at frequencies of approximately 1 MHz and 26-27 MHz). However, the time-averaged PSDs 152, 154, and 156 span power ranges from approximately −17 dB/Hz at the peaks to approximately −55 dB/Hz (i.e., at frequencies between approximately 0-2 MHz and 26-28 MHz). Accordingly, time-averaging the PSD results in a significantly more resolute PSD. Furthermore, while increasing the number of time blocks in the time-averaging performed by the averaging component 54 decreases response time, it can further increase the resolution of the respective time-averaged PSD.

Referring back to the example of FIG. 2, the spoof detection system 50 includes a memory 56 and a normalization component 60. The memory 56 is configured to store a predetermined baseline PSD 58. As an example, the predetermined baseline PSD 58 can be a PSD that is acquired from an RF signal at a previous time that is known to not include a spoofing signal component. The PSD processor 52 could receive the previous RF signal and, similar to as described previously, can generate a time-averaged PSD of the previous RF signal based on a predetermined number of time blocks via the averaging component 54. The predetermined number of time blocks can thus be the same number of time blocks implemented by the averaging component 54 in generating the time-averaged PSD of the digital signal DIG during normal operation of the RF receiver system 10 to detect spoofing signal components in the RF signal IN.

Figure 5:
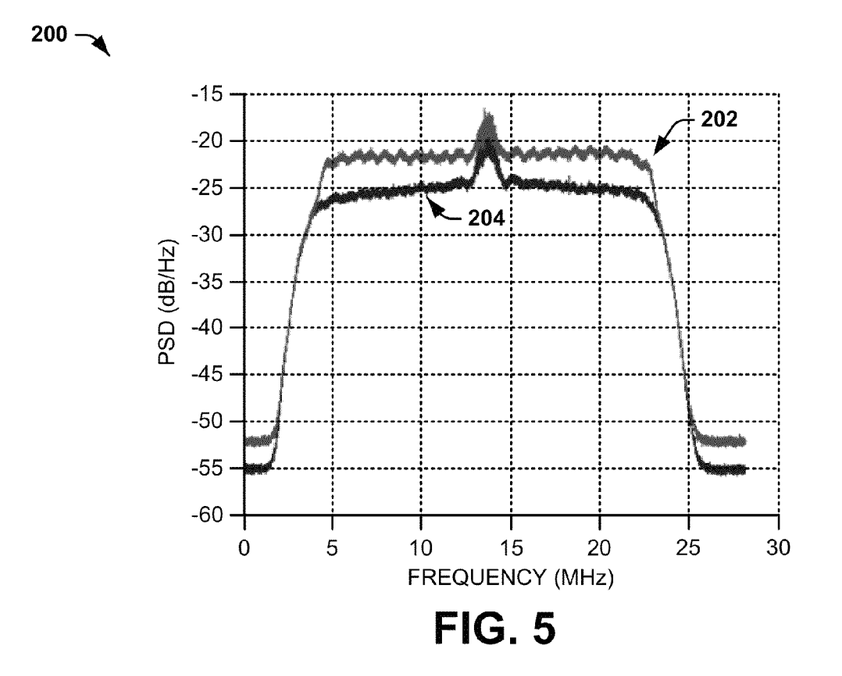
FIG. 5 illustrates an example diagram of superimposed time-averaged PSDs of RF signals in accordance with an aspect of the invention.

The normalization component 60 can be configured to normalize the time-averaged PSD of the digital signal DIG with respect to the predetermined baseline PSD 58. FIG. 5 illustrates an example diagram 200 of superimposed PSDs of RF signals in accordance with an aspect of the invention. The diagram 200 includes a first PSD 202 that can correspond to the time-averaged PSD of the digital signal DIG and a second PSD 204 that can correspond to the predetermined baseline PSD 58. In the example of FIG. 5, the PSD 202 has an amplitude that is greater, on the whole, than the PSD 204. A variation in amplitude of the PSD 202 relative to the PSD 204 can occur for a variety of reasons. For example, one such reason can be the presence of a spoofing signal component in the RF signal IN, while another reason can be changes in temperature of the RF signal front-end system 14 in the example of FIG. 1. Therefore, the normalization component 60 can normalize the time-averaged PSD of the digital signal DIG (e.g., the PSD 202) with respect to the predetermined baseline PSD 58 (e.g., the PSD 204), such that a comparison of the time-averaged PSD of the digital signal DIG with the predetermined baseline PSD 58 can be substantially insensitive to temperature variations.

Referring back to the example of FIG. 2, to normalize the time-averaged PSD of the digital signal DIG, as an example, the normalization component 60 can be configured to provide a scale factor SF_PSD to the PSD processor 52 based on an analysis of the predetermined baseline PSD 58. Therefore, the PSD processor 52 can multiply the time-averaged PSD by the scale factor SF_PSD to normalize the time-averaged PSD to an approximately comparable magnitude of the predetermined baseline PSD 58. As another example, the normalization component 56 can set a normalization magnitude and provide the scale factor SF_PSD to the PSD processor 52 and a scale factor SF_BL to the predetermined baseline PSD 58, such that each of the time-averaged PSD and the predetermined baseline PSD 58 can each be normalized to the normalization magnitude.

Upon the time-averaged PSD of the digital signal DIG being normalized, the normalized time-averaged PSD is provided to a PSD comparator 62, demonstrated in the example of FIG. 2 as via a signal PSD. The PSD comparator 62 is configured to compare the normalized time-averaged PSD with the predetermined baseline PSD 58. As an example, the PSD comparator 62 can be configured to provide digital filtering to the time-averaged PSD of the digital signal DIG and to the predetermined baseline PSD 58 prior to the comparison, such as to reduce a noise-like variability in the spectrum resulting from relatively narrow-band data that is encoded therein. For example, in the example of the RF receiver system 10 being configured as a GPS receiver, the PSD comparator 62 can be configured to remove (e.g., ignore) time-averaged samples associated with a course acquisition (C/A) code or military navigation code encoded in the respective GPS signals corresponding to the time-averaged PSD of the digital signal DIG and the predetermined baseline PSD 58.

Figure 6:
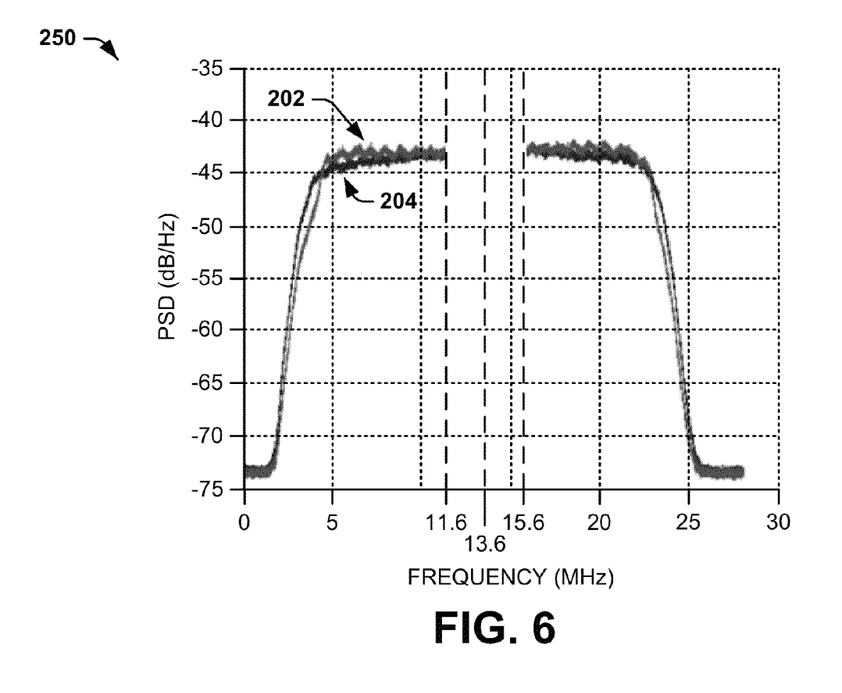
FIG. 6 illustrates another example diagram of superimposed time-averaged PSDs of RF signals in accordance with an aspect of the invention.

FIG. 6 illustrates another example diagram 250 of superimposed time-averaged PSDs of RF signals in accordance with an aspect of the invention. The diagram 250 demonstrates the first PSD 202 corresponding to the time-averaged PSD of the digital signal DIG and the second PSD 204 corresponding to the predetermined baseline PSD 58 having been normalized with respect to each other. However, in the example of FIG. 6, a peak approximately centered at 13.6 MHz has been substantially removed, such as based on the PSD comparator 62 ignoring the time-averaged samples in each of the first and second PSDs 202 and 204. In the example of FIG. 6, the bandwidth of the filtered region is demonstrated as approximately 4 MHz, such that the bandwidth between 11.6 MHz and 15.6 MHz has been removed. As a result, the comparison of the time-averaged PSD of the digital signal DIG (e.g., the first PSD) and the predetermined baseline PSD 58 (e.g., the second PSD 204) can be performed regardless of variation in the data encoded therein.

Referring back to the example of FIG. 2, the PSD comparator 62 includes an analysis algorithm 64 configured to implement the comparison between the time-averaged PSD of the digital signal DIG and the predetermined baseline PSD 58. As an example, the analysis algorithm 64 can calculate test statistics associated with the time-averaged PSD and the predetermined baseline PSD 58 to determine a difference between them, such as to indicate the presence of a spoofing signal component in the RF signal IN. As an example, the analysis algorithm 64 can be implemented to determine a standard deviation difference between the time-averaged PSD of the digital signal DIG and the predetermined baseline PSD 58, as follows:

$$\sigma_{psd}(t) = \sqrt{\frac{1}{N}\sum_{k=1}^{N/2}\left(PSD_{spoofer}^{Avg}(k, t) - PSD_{baseline}^{Avg}(k, t)\right)^2} \quad \text{Equations 2}$$

where:

$$t = MT_{Avg}$$

$$PSD^{Avg}(k, t) = \frac{1}{M_{AVG}}\sum_{m} PSD(k, m)$$

$$(M - 1)M_{Avg} <= m <= MM_{Avg}$$

Where:

$PSD^{Avg}(k)$ is the PSD averaged over $M^{Avg}$ time blocks;
$PSD(k,m)$ is the normalized PSD of the block in;
$M_{Avg}$ is the number of time blocks associated with the time-averaging;
$T_{Avg}$ is a duration of the average window ($T_{avg}=M^{Avg}NT_s$);
k is the frequency bin; and
$T_s$ is a sample size (e.g., 1/56.32 MHz).

In the example algorithm demonstrated by the Equations 2, it is to be understood that the averaging is performed before the variance is calculated.

The analysis algorithm 64 can thus implement the test statistics calculated based on Equations 2 to detect the presence of a spoofing signal component in the RF signal IN. As an example, a detection margin calculated based on Equations 2 can have a magnitude that can be compared with a threshold across the frequency band of the time-averaged PSD of the digital signal DIG relative to the predetermined baseline PSD 58. As a result, the threshold being exceeded for substantial portions of the frequency band of the time-averaged PSD relative to the predetermined baseline PSD 58 can be indicative of a signature of a spoofing signal component. Accordingly, the PSD comparator 62 can identify the presence of the spoofing signal component.

It is to be understood that the spoof detection system 50 is not intended to be limited to the example of FIG. 2. As an example, because many of the functions described with respect to the spoof detection system 50 can be implemented in software, it is to be understood that the components described herein need not be implemented in the order or arrangement described in the example of FIG. 2. In addition, the spoof detection system 50 can include a variety of additional data processing components not depicted in the example of FIG. 2 for the sake of simplicity. Furthermore, attached Appendix A provides one example implementation of spoofing signal component detection described herein, such as can be implemented in the spoof detection system 50.

Figure 7:
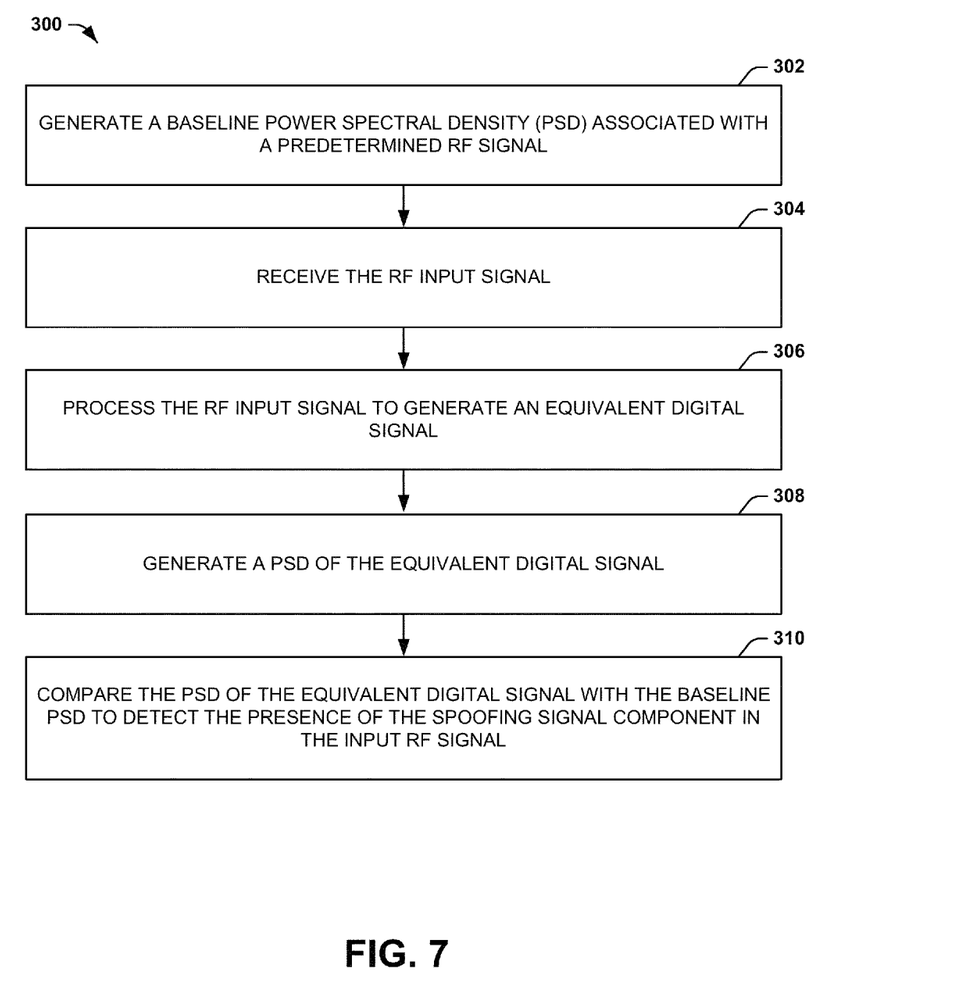
FIG. 7 illustrates a method for detecting a spoofing signal component in an input RF signal in accordance with an aspect of the invention.

In view of the foregoing structural and functional features described above, a methodology in accordance with various aspects of the present invention will be better appreciated with reference to FIG. 7. While, for purposes of simplicity of explanation, the methodology of FIG. 7 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 7 illustrates a method 300 for detecting a spoofing signal component in an input RF signal in accordance with an aspect of the invention. At 302, a baseline PSD associated with a predetermined RF signal is generated. The baseline PSD can be generated from a predetermined RF signal in which spoofing signal components are known to be absent, or could be generated from offline simulation data that simulates a non-spoofing RF signal. At 304, the RF input signal is received. The RF input signal can be received at an RF front-end system, such as a GPS system. At 306, the RF input signal is processed to generate an equivalent digital signal. The processing of the RF input signal can be a digitization to generate digital samples corresponding to the RF input signal.

At 308, a PSD of the equivalent digital signal is generated. The PSD of the equivalent digital signal can be a time-averaged PSD of the equivalent digital signal, such as over a predetermined number of time blocks equal to a predetermined number of time blocks of time-averaging associated with the baseline PSD. At 310, the PSD of the equivalent digital signal is compared with the baseline PSD to detect the presence of the spoofing signal component in the input RF signal. The comparison of the PSDs can be based on implementing a statistical difference algorithm, such as based on generating a standard deviation, across the PSD of the equivalent digital signal and the baseline PSD. The spoofing signal component can thus be detected upon the standard deviation of the PSD of the equivalent digital signal being greater than the standard deviation of the baseline PSD by a predetermined threshold.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A radio frequency (RF) receiver system comprising:
an antenna configured to receive an RF input signal;
an RF signal front-end system configured to process the RF input signal to generate an equivalent digital signal; and
a spoof detection system comprising:
a memory configured to store a predetermined baseline power spectral density (PSD) corresponding to a baseline RF signal in which the spoofing signal component is known to be absent;
a PSD processor configured to generate a time-averaged PSD of the equivalent digital signal; and
a PSD comparator configured to implement a statistical difference algorithm across the time-averaged PSD of the equivalent digital signal relative to the predetermined baseline PSD to detect a spoofing signal component in the RF input signal.

2. The system of claim 1, wherein the spoof detection system further comprises a normalization component configured to normalize the time-averaged PSD of the equivalent digital signal and the baseline PSD, wherein the PSD comparator is further configured to compare the normalized time-averaged PSD of the equivalent digital signal and the normalized baseline PSD based on the statistical difference algorithm.

3. The system of claim 1, wherein the PSD comparator is further configured to substantially filter a data component associated with the time-averaged PSD of the equivalent digital signal and with the predetermined baseline PSD before implementing the statistical difference algorithm, wherein the PSD comparator is further configured to compare the filtered time-averaged PSD of the equivalent digital signal and the filtered baseline PSD based on the statistical difference algorithm.

4. The system of claim 1, wherein the statistical difference algorithm comprises a standard deviation of a difference between the PSD of the equivalent digital signal relative to the predetermined baseline PSD, wherein the PSD comparator is configured to detect the spoofing signal component in the RF input signal in response to the standard deviation of the difference exceeding a threshold.

5. The system of claim 3, wherein the RF input signal is a global navigation satellite system (GNSS) signal, and wherein the data component is a course acquisition code.

6. A radio frequency (RF) receiver system comprising:
an antenna configured to receive an RF input signal;
an RF signal front-end system configured to process the RF input signal to generate an equivalent digital signal; and
a spoof detection system comprising:
- a memory configured to store a predetermined baseline power spectral density (PSD) corresponding to a baseline RF signal in which the spoofing signal component is known to be absent;
- a PSD processor configured to generate a time-averaged PSD of the equivalent digital signal; and
- a PSD comparator configured to substantially filter a data component associated with the time-averaged PSD of the equivalent digital signal and with the predetermined baseline PSD and to compare the time-averaged PSD of the equivalent digital signal with the predetermined baseline PSD to detect the presence of a spoofing signal component in the RF input signal.

7. The system of claim 6, wherein the spoof detection system further comprises a normalization component configured to normalize the time-averaged PSD of the equivalent digital signal and the baseline PSD, wherein the PSD comparator is further configured to compare the normalized filtered time-averaged PSD of the equivalent digital signal and the normalized filtered baseline PSD to detect the presence of a spoofing signal component in the RF input signal.

8. The system of claim 6, wherein the PSD comparator is configured to compare the time-averaged PSD of the equivalent digital signal with the predetermined baseline PSD based on determining a standard deviation of a difference between the PSD of the equivalent digital signal relative to the predetermined baseline PSD, and is further configured to detect the spoofing signal component in the RF input signal in response to the standard deviation of the difference exceeding a threshold.

9. The system of claim 6, wherein the RF input signal is a global navigation satellite system (GNSS) signal, and wherein the data component is a course acquisition code.

10. A radio frequency (RF) receiver system comprising:
an antenna configured to receive an RF input signal;
an RF signal front-end system configured to process the RF input signal to generate an equivalent digital signal; and
a spoof detection system comprising:
- a memory configured to store a predetermined baseline power spectral density (PSD) corresponding to a baseline RF signal in which the spoofing signal component is known to be absent;
- a PSD processor configured to generate a time-averaged PSD of the equivalent digital signal;
- a normalization component configured to normalize the time-averaged PSD of the equivalent digital signal and the baseline PSD; and
- a PSD comparator configured to compare the normalized time-averaged PSD of the equivalent digital signal with the normalized predetermined baseline PSD to detect the presence of a spoofing signal component in the RF input signal.

11. The system of claim 10, wherein the PSD comparator is configured to compare the normalized time-averaged PSD of the equivalent digital signal with the normalized predetermined baseline PSD based on determining a standard deviation of a difference between the normalized PSD of the equivalent digital signal relative to the normalized predetermined baseline PSD, and is further configured to detect the spoofing signal component in the RF input signal in response to the standard deviation of the difference exceeding a threshold.

12. The system of claim 10, wherein the PSD comparator is further configured to substantially filter a data component associated with the normalized time-averaged PSD of the equivalent digital signal and with the normalized predetermined baseline PSD, wherein the PSD comparator is further configured to compare the filtered normalized time-averaged PSD of the equivalent digital signal and the filtered normalized baseline PSD to detect the presence of a spoofing signal component in the RF input signal.

13. The system of claim 12, wherein the RF input signal is a global navigation satellite system (GNSS) signal, and wherein the data component is a course acquisition code.

* * * * *